Patented Oct. 6, 1925.

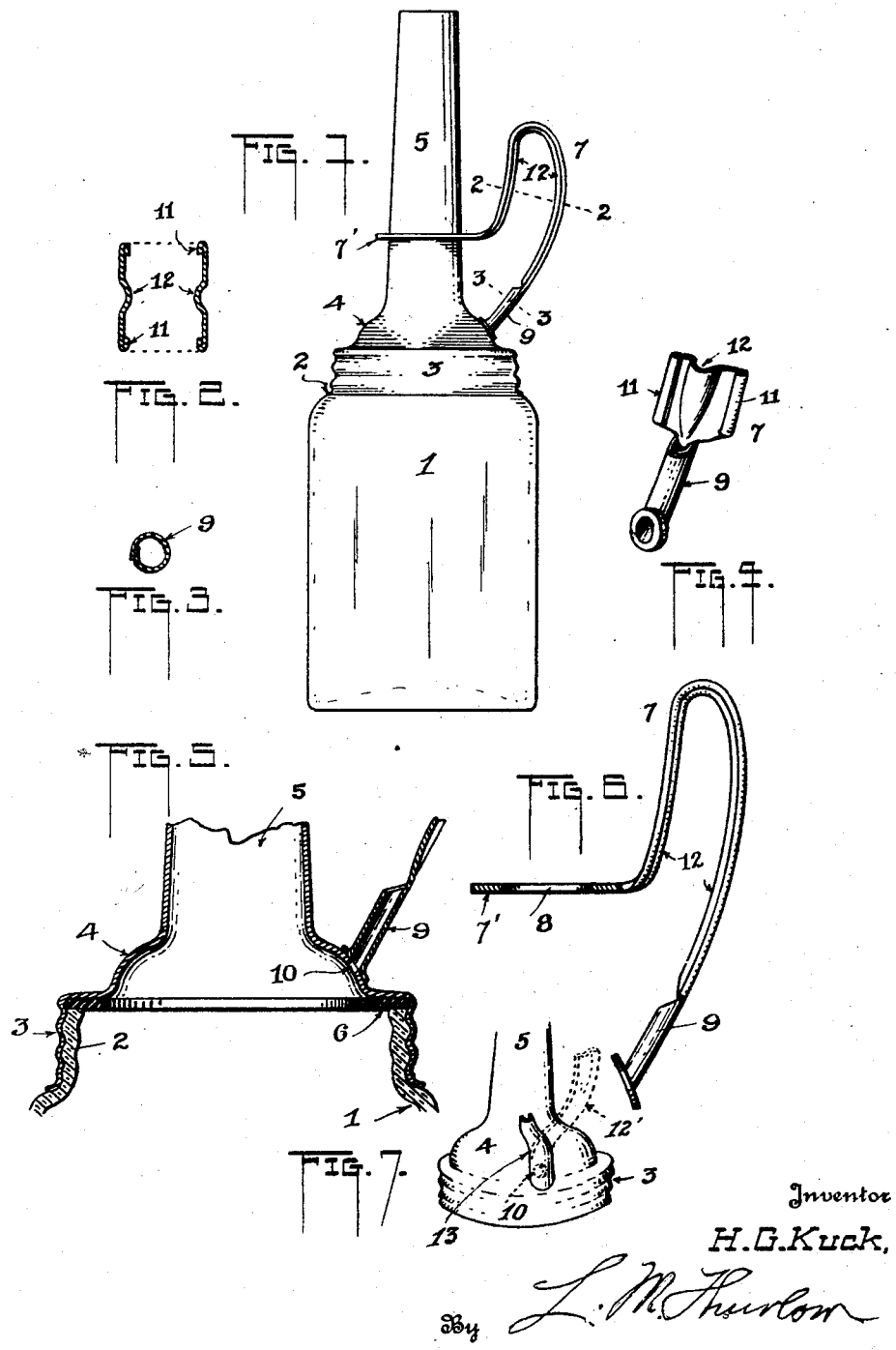

1,556,150

UNITED STATES PATENT OFFICE.

HENRY G. KUCK, OF PEORIA, ILLINOIS.

DISPENSING CAN.

Application filed July 3, 1924. Serial No. 723,935.

*To all whom it may concern:*

Be it known that I, HENRY G. KUCK, a citizen of the United States, residing at Peoria, in the county of Peoria and State of Illinois, have invented new and useful Improvements in Dispensing Cans; and I do hereby declare that the following is a full, clear, and exact description of the invention, which will enable others skilled in the art to which it appertains to make and use the same.

This invention relates to improvements in dispensing cans, being designed particularly for dispensing oil at depots from which oils are sold to drivers of automobiles.

An object of my invention is to provide a package for dispensing liquids that will be of simple and sturdy construction.

Another object is that of providing a package or "can" provided with a filling and discharging nozzle including a closure portion for said can, and to attach a handle to the affair in such position that the can may be conveniently handled.

Another object is to attach a handle to such nozzle and closure in such manner that the parts will be thoroughly braced, and, in turn, the parts will brace the handle, making an exceedingly strong outfit capable of withstanding serve use.

Still another object, and an important one, is to form a handle for attachment to the nozzle and its closure which shall include a vent tube to communicate with an opening in said cap for passage of air to and from the can.

Again, an object is to provide a vent tube for the can closure and place the handle of the can adjacent to it so that said tube will always occupy the "high" side of the can during the pouring operation.

In the appended drawing,

Figure 1 is an elevation of a dispensing can showing my invention.

Figures 2 and 3 are sections on lines 2—2 and 3—3 respectively of Figure 1, much enlarged.

Figure 4 shows part of a handle and a vent tube in perspective.

Figure 5 is a vertical section, much enlarged, of parts shown in Figure 1.

Figure 6 is a side elevation of a handle shown in Figure 1, much enlarged, part being shown in section, and Figure 7 is a modification of a vent tube arrangement.

The container or "can" may be a glass jar 1 provided with the usual threaded neck 2, as for example, the common Mason fruit jar. A threaded portion or dome 3 screws upon the said neck 2 and formed therewith is a domed portion 4 terminating in a pouring spout or nozzle 5 which, preferably, is large enough in diameter at its free outer extremity to permit the can to be readily filled therethrough, a gasket or ring 6 being inserted between the portion 3 and the neck 2, of course, to prevent leakage from the can.

I provide a handle 7 shown in Figures 1 and 6 which at one end has a flat portion 7' somewhat larger in extent than the diameter of the nozzle or spout-portion 5. This said flat portion is provided with a hole 8 of a diameter that will snugly fit the nozzle at a point some considerable distance from its free extremity, Figure 1, and preferably the portion may be soldered to the nozzle.

From said portion 7' the handle is bent for some distance in the direction of the discharge end of the nozzle but spaced from said nozzle, being then returned or bent toward the dome 4 terminating at said dome in a tubular part 9 which is soldered thereto communicating with a vent opening 10 in the latter, Figure 5.

The said tubular part may be separate from the handle and then attached thereto in assembling the parts, or, as shown in the drawing may be an integral part of the handle.

In the present instance the handle is of sufficient width to permit its edges to be rolled inwardly upon one another as shown in Figures 3 and 4 and soldered into a tight tube which may or may not be flanged as shown.

To the end that the handle may be a rigid affair so as not to bend under strains its edges are preferably overlapped as at 11 and a depression is made along its middle to form a bead 12.

By placing the tube 9 as shown it must always be at the back of the device so that the liquid cannot escape through it when said device is held by its handle. Placed near the handle or made a part of that member it is protected from injury. A vent is always desirable in a device that is otherwise closed when being filled or when the liquid is being discharged and I have found the position shown for the tube 9 to be the best for its protection together with the fact that no mistake can be made in using the device when the handle is used in the act of discharging the contents.

The handle portion 7' is disposed as shown in order that the nozzle or spout may be dropped into the neck of the "breather" pipe of an automobile for example and there left until drained and at the same time the grasping portion is placed advantageously for use. Again, since the portion 7' is readily made into a ring by forming the hole 8 therein it can be dropped upon the nozzle and secured by a drop of solder, a very simple operation entailing but a minimum of time in the assembly operation, it being only necessary to then solder or otherwise secure the tube 9 to the dome 3, 4.

As shown in Figure 7 the tube indicated in this instance by 13 may overlie the dome portion 4 and be soldered thereto, communicating as before with the vent opening 10, the handle 12' being affixed thereto or to the dome adjacent to it, this being indicative of another way of employing a tube for the purpose set forth.

I claim:

1. A dispensing device comprising a receptacle for a liquid, a separate nozzle or spout having a threaded base to tightly screw upon said receptacle, and having a vent above the threaded base, a tubular portion secured adjacent said vent and opening into it, and a handle extending from the tubular portion and attached to the nozzle.

2. A dispensing device for liquids comprising a recepacle, a separate nozzle or spout including a base adapted to be connected to the receptacle and detachable therefrom, and a handle including a tubular portion formed therewith secured at one end upon the nozzle and opening into the same above its base.

3. A dispensing device for liquids comprising a receptacle, a nozzle or spout having a base portion adapted to be secured on the receptacle, a handle having a ring at one end encircling the nozzle or spout, and having at its other end an open tubular portion attached to the nozzle above its base portion communicating with the interior of the nozzle.

4. A dispensing device for liquids comprising a receptacle, a nozzle or spout having a base portion adapted to be secured to the receptacle, a handle having at one end a ring encircling the nozzle and disposed near the base thereof, said handle being bent toward the free open end of the nozzle but spaced therefrom and recurved having a tubular portion formed in its other end secured to the nozzle above its base portion communicating with the interior of said nozzle.

5. A dispensing device for liquids comprising a receptacle, a nozzle or spout adapted to be detachably secured at its base thereto, a tubular portion disposed above the said base of the nozzle opening into the same and secured liquid tight thereto, and a handle secured at one end of the tubular portion and held at its other end on the said nozzle or spout above the position of the said tubular portion.

In testimony whereof I affix my signature.

HENRY G. KUCK.